(12) United States Patent
Levinson

(10) Patent No.: US 10,136,711 B2
(45) Date of Patent: Nov. 27, 2018

(54) METAL PURSE

(71) Applicant: Jeffrey Levinson, Wynnewood, PA (US)

(72) Inventor: Jeffrey Levinson, Wynnewood, PA (US)

( * ) Notice: Subject to any disclaimer, the term of this patent is extended or adjusted under 35 U.S.C. 154(b) by 0 days.

(21) Appl. No.: 14/605,423

(22) Filed: Jan. 26, 2015

(65) Prior Publication Data

US 2015/0208773 A1   Jul. 30, 2015

Related U.S. Application Data

(60) Provisional application No. 61/931,607, filed on Jan. 25, 2014.

(51) Int. Cl.
*A45C 13/08* (2006.01)
*A45C 1/02* (2006.01)
*H04B 1/3888* (2015.01)
*A45C 11/00* (2006.01)

(52) U.S. Cl.
CPC ............... *A45C 1/02* (2013.01); *A45C 13/08* (2013.01); *A45C 2011/002* (2013.01); *H04B 1/3888* (2013.01)

(58) Field of Classification Search
CPC .. A45C 2011/002; A45C 13/08; H04B 1/3888
USPC ........... 220/832; 190/106, 119, 121, 125, 28
See application file for complete search history.

(56) References Cited

U.S. PATENT DOCUMENTS

| 3,623,580 | A | * | 11/1971 | Toller | A45C 5/00 190/115 |
| 4,270,590 | A | * | 6/1981 | Marshall | A45C 5/00 190/100 |
| 6,092,717 | A | * | 7/2000 | Lowry | B65D 3/22 229/120.03 |
| 6,789,692 | B2 | * | 9/2004 | Prezelin | B65D 51/16 190/119 |
| 7,240,778 | B2 | * | 7/2007 | Duncanson | A45C 13/08 150/105 |
| 8,186,508 | B2 | * | 5/2012 | Fan | A45C 11/00 206/320 |
| 8,567,600 | B2 | * | 10/2013 | Fan | A45C 11/00 206/320 |
| 2004/0198470 | A1 | * | 10/2004 | Dyer | A45C 11/00 455/575.1 |

(Continued)

FOREIGN PATENT DOCUMENTS

| CN | 201123486 Y | 10/2008 |
| CN | 102551300 A | 7/2012 |

(Continued)

OTHER PUBLICATIONS

First Office Action dated Jun. 2, 2017 (dated Jun. 2, 2017) in correspondence Chinese Patent Application No. 201580016525.7.

(Continued)

*Primary Examiner* — Sue A Weaver
(74) *Attorney, Agent, or Firm* — Pepper Hamilton LLP

(57) ABSTRACT

Disclosed are metal purses, particularly clam shell type purses made of metal and in some embodiments, provided with a gap between the shells sufficient to allow for cell phone reception within the purse. Aesthetic exterior shells may also be applied.

10 Claims, 7 Drawing Sheets

(56) References Cited

U.S. PATENT DOCUMENTS

| | | | |
|---|---|---|---|
| 2006/0201764 A1* | 9/2006 | Morszeck | A45C 5/02 |
| | | | 190/125 |
| 2012/0073873 A1 | 3/2012 | Nash | |
| 2013/0107503 A1 | 5/2013 | Leuty | |
| 2014/0203020 A1* | 7/2014 | Trombino | A45C 11/00 |
| | | | 220/500 |

FOREIGN PATENT DOCUMENTS

| | | |
|---|---|---|
| CN | 104955356 A | 9/2015 |
| DE | 199 41 452 A1 | 3/2001 |
| DE | 19941452 A1 | 3/2001 |

OTHER PUBLICATIONS

Chinese Office Action dated Apr. 11, 2018 in corresponding Chinese Patent Application No. 201580016525.7.
International Search Report dated May 8, 2015 in corresponding International Patent Application No. PCT/US2015/012889.

* cited by examiner

METAL PURSE

CROSS REFERENCE TO RELATED APPLICATIONS

This application claims priority to U.S. Provisional Patent Application No. 61/931,607, filed on Jan. 25, 2014, which is hereby incorporated by reference in its entirety herein.

FIELD

The disclosed technology relates to clothing accessories, particularly purses or clutch-style purses. More particularly, disclosed herein are metal purses or clutches. Metal purses or clutches designed to allow cellular phone reception are also disclosed.

BACKGROUND

The world of high fashion is demanding and ever changing, and yet revisits and improves on prior trends. Simple, stylish, yet functional items are constantly in demand. Purses or clutches must be of sufficient size to hold desired items, such as cosmetics, a wallet, and, increasingly, a cellular phone or other wireless device. Purses and clutches are known to be made of many materials, cotton, leather, silk, and even metal. Metal purses present a unique challenge to modem life in that the metal interferes with cellular and other wireless signals. When housing a cellular phone or wireless device in a purse or clutch, in some instances it is desirable for the device to maintain connection with the wireless carrier or other network. Accordingly, not only is there a need for improved designs of metal purses or clutches, but there is a need for such clutches that address the desire to receive cellular or wireless signal, even in a closed purse or clutch, while maintaining style.

SUMMARY

Some embodiments provide a purse comprising two metal shells interconnected by a hinge for rotation with respect to one another about the hinge, between and open and a closed position, and defining a storage cavity therebetween, where each metal shell further comprises a mated peripheral edge, wherein in the closed position, the two metal shells for a gap of a desired gap distance therebetween, such that the gap distance is sufficient to allow the passage of cellular or wireless signals into and out of the purse, when closed.

In some embodiments, the desired gap distance is sufficient to yield a signal strength of at least −110 dBm in the purse, when closed.

In some embodiments, gap distance is sufficient to provide a signal strength of at least −106 dBm, at least −105 dBm, at least −103 dBm, at least −102 dBm, at least −101 dBm, at least −100 dBM, at least −97 dBm, at least −95 dBm, at least −93 dBm, at least −90 dBM or any value or range of values therebetween, including endpoints.

In some embodiments, the gap distance is about 0.010 inch, about 0.015 inch, about 0.020 inch, about 0.025 inch, about 0.027 inch, about 0.030 inch, about 0.035 inch, about 0.040 inch, about 0.041 inch, about 0.045 inch, about 0.050 inch, about 0.055 inch, about 0.060 inch, about 0.070 inch, about 0.080 inch, about 0.090 inch, about 0.010 inch or any value or range of values between any of these values, including endpoints.

In some embodiments, the purse has a bivalve construction.

In some embodiments, the purse further defines one of a slot or a plurality of perforations to enhance the effect of the gap on signal strength.

In some embodiments, the metal purse further comprises at least one outer decorative shell affixed to the metal shell.

In some embodiments, the outer decorative shell comprises plastic or polycarbonate.

In some embodiments, the outer decorative shell is permanently affixed to the metal shell.

In some embodiments, the outer decorative shell is removably affixed to the metal shell.

Other embodiments will be apparent from this specification without departing from the scope and spirit of this disclosure.

DETAILED DESCRIPTION

Generally, disclosed herein are various embodiments of a metal purse, which may be in the form of a clutch. For simplicity, we will refer to such a purse or clutch generically as a purse. As is common in the industry, the purse is made up of an outer portion and an inner lining. In this case, the outer portion is, in fact, a metal shell. The metal shell is generally in a bivalve construction, having a hinge connecting two halves which rotate about the hinge to expose the interior of the purse. In some embodiments, the exterior surface of the metal shell may be painted or otherwise coated for decorative and/or protective purposes. In some embodiments, at least one half of the bivalve, and in most instance both halves, are provided with an outer shell, which may be decorated. The outer shell may be of any suitable material, with plastics and polycarbonate being particularly well suited to the task.

The metal shell can take any shape or geometry and any type of construction. Particularly, a bivalve construction having two halves affixed to each other via one or more hinges provides a good balance of aesthetics and functionality. The metal shell may be made of any suitable metal or metal alloy. Without limitation, the metal shell may be made of steel, stainless steel, aluminum, copper, bronze, precious metals such as gold and silver, or combinations thereof. Each metal shell is substantially solid, although some embodiments may be provided with perforations and or one or more slot as described further below.

The lining may be any appropriate material, and is usually cloth or leather. A lining is not necessary to proper operation of the purse, and therefore may be omitted in some embodiments. The lining, when present, has aesthetic value and function in that it cushions items contained in the purse, may provide pockets or other details, and reduces the sound of items moving within the purse.

The purse may also be configured with a stop to prevent over rotation of the hinge, or to limit its travel to a predetermined angle, for example 90 degrees or 110 degrees. In some instances this is desirable to prevent the purse from inadvertently opening fully and releasing it contents.

The purse may further be provided with a latch to keep the purse closed when desired. Alternatively, the purse may contain spring-loaded hinged or similar mechanism to bias the purse into a closed position to secure its contents. As will be appreciated by those of skill in the art, the purse may also be adapted to hold open again via spring-loaded hinges or with support arms and the like. In some embodiments, a decorative latch may be used in conjunction with these other methods.

Figure 1:
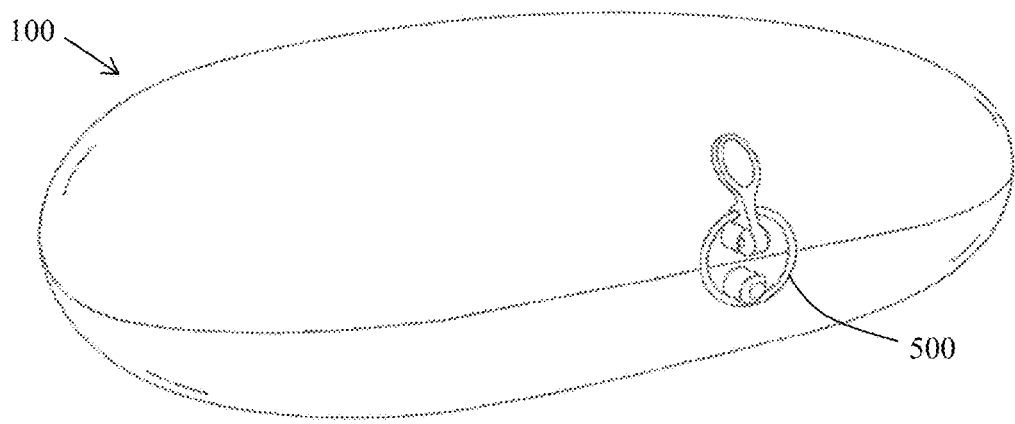
FIG. 1 is a perspective view of a purse and latch in accordance with some embodiments.
Figure 2:
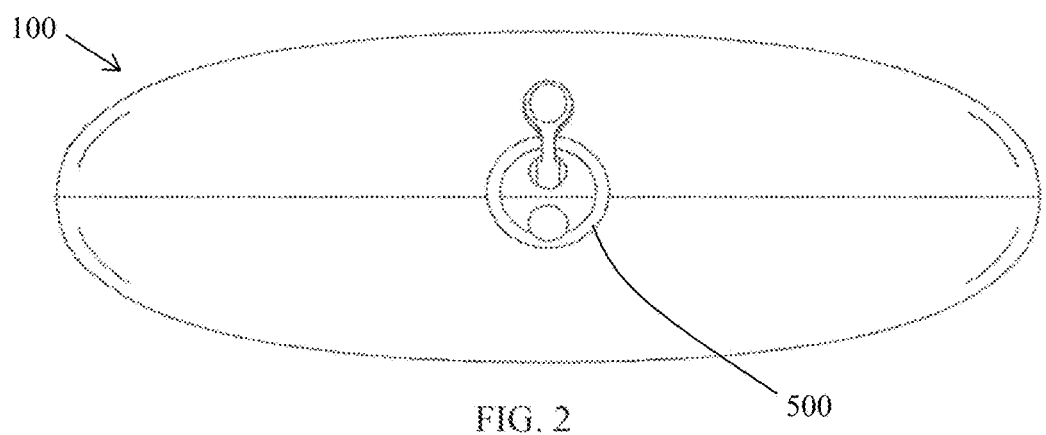
FIG. 2 is a front view of a purse and latch in accordance with some embodiments.
Figure 3:
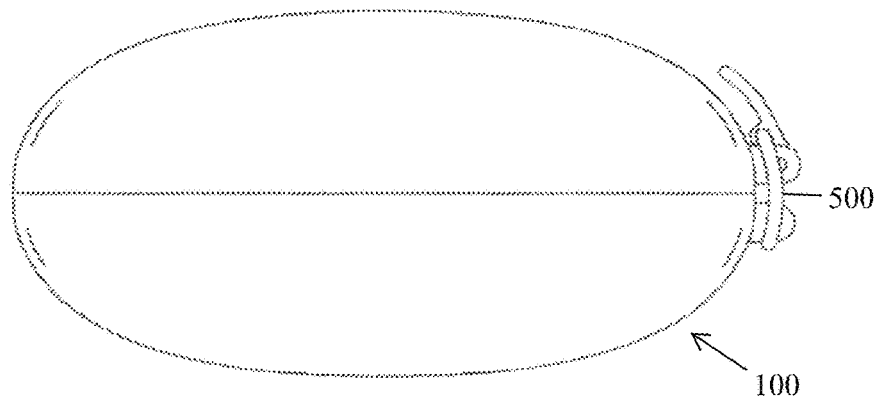
FIG. 3 is a side view of a purse and latch in accordance with some embodiments.
Figure 4A:
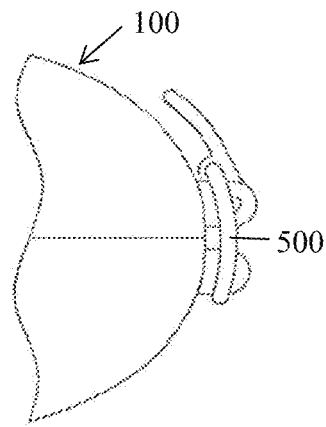
FIG. 4A is a side view of a purse and latch, shown closed in accordance with some embodiments.
Figure 4B:
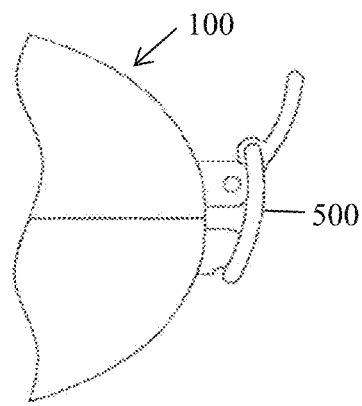
FIG. 4B is a side view of a purse and latch, shown partially unlatched, in accordance with some embodiments.
Figure 4C:
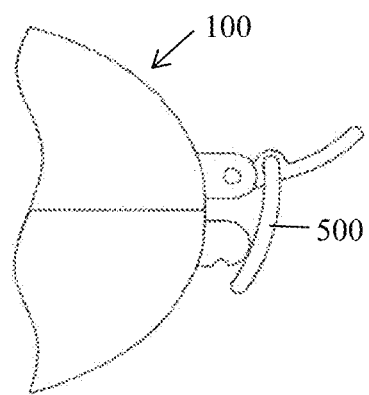
FIG. 4C is a side view of a purse and latch, shown unlatched, in accordance with some embodiments.
Figure 5:
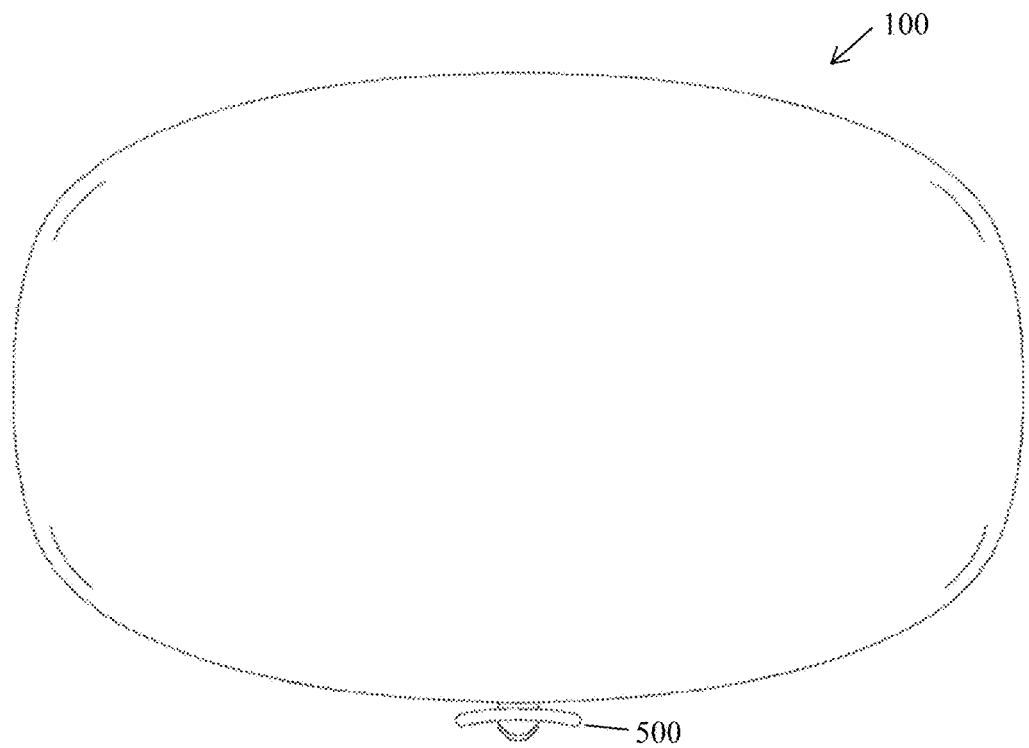
FIG. 5 is a bottom view of a purse and latch in accordance with some embodiments.

FIGS. 1-5 show a purse in accordance with some embodiments. FIG. 1 depicts a purse 100, having a metal shell 10A, 10B in a bivalve construction. A decorative latch 500 is also shown in FIG. 1. As shown, the purse is generally rounded and oblong in shape. The purse may be any desired shape and size. As depicted, the metal shell is smooth and rounded. Other shapes such as square, rectangular or other shapes may be employed without straying from the scope and spirit of this disclosure.

Figure 6:
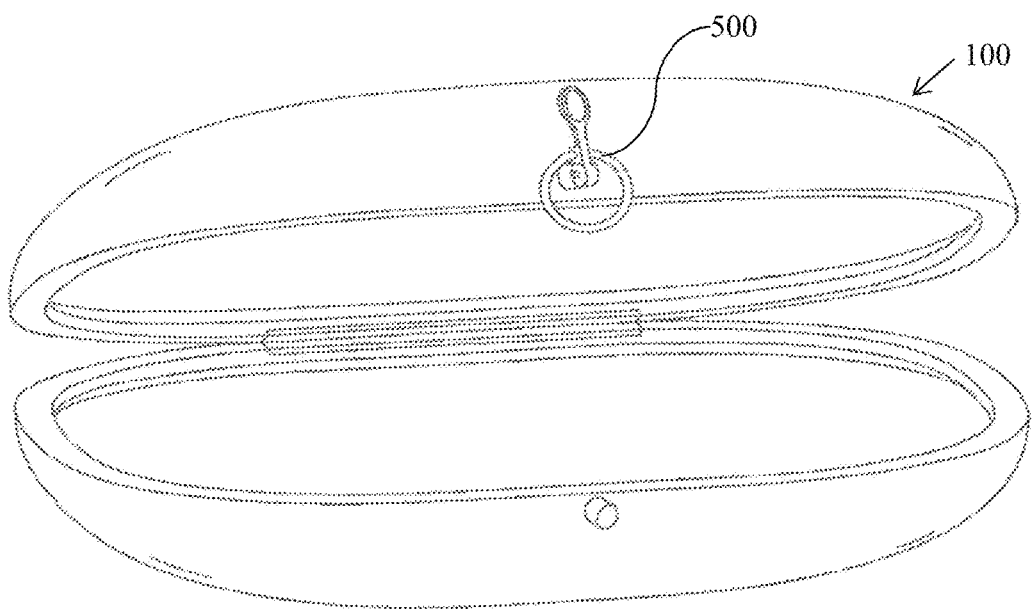
FIG. 6 is a perspective view of a purse and latch, shown in an open arrangement, in accordance with some embodiments.
Figure 7A:
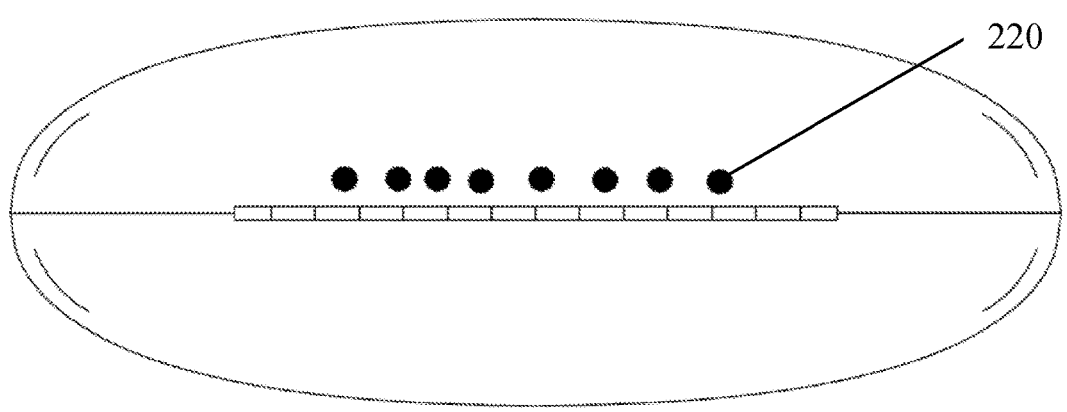
FIGS. 7A and 7B are perspective views of embodiments showing perforations, a slot, and a gap, respectively.
Figure 7B:
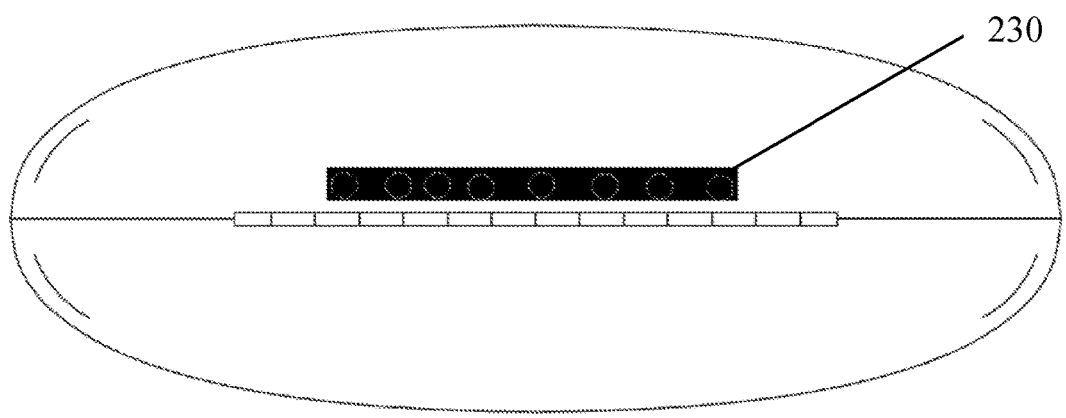
Figure 8:
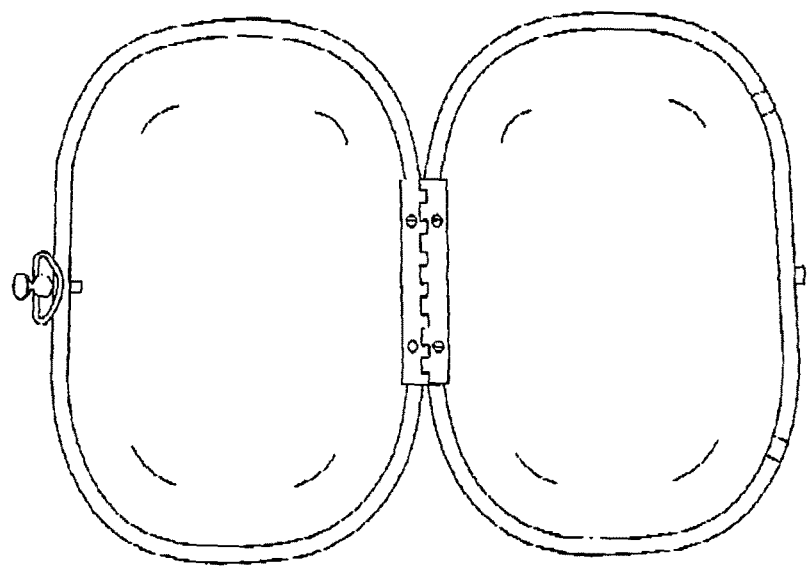
FIG. 8 is a top view of a bivalve purse in a fully open position.
Figure 9A:
FIGS. 9A-9D are various views of an outer plastic shell for use in some embodiments.
Figure 9B:
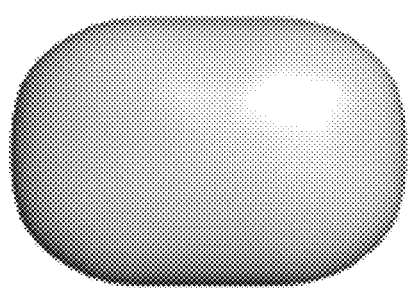
Figure 9C:
Figure 9D:
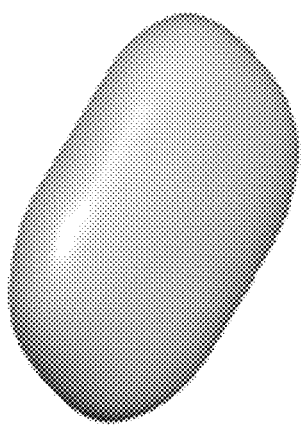
Figure 10:
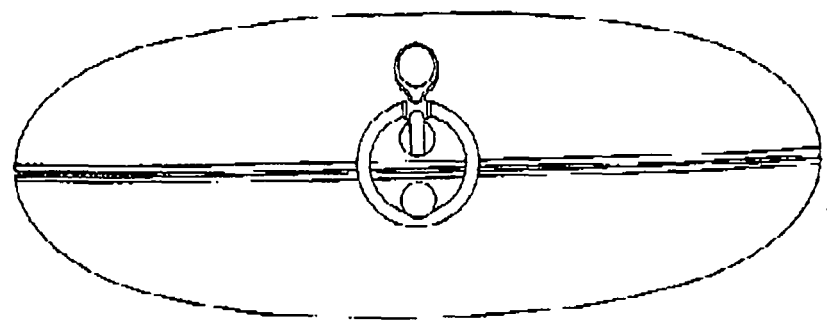
FIG. 10 is a side view of one embodiment of a purse as described herein.

FIG. 6 shows a perspective view of the purse in an open position. This position reveals the interior of the purse, defined by the metal shell, and the hinge connecting the two halves of the bivalve metal shell. The hinge can be any conventional hinge used to connect two bodies for rotation with respect to one another, such as a piano hinge or the like. Depending on the size and configuration, a single hinge or multiple hinges may be used. In some embodiments, the metal shell is provided with a recess to accommodate the hinges. Although the figures and this description focus on a bivalve construction, other constructions are possible.

In some embodiments, the outer surface of the metal shell can be covered with paint, powder coating, or other surface treatment. In some embodiments, the metal shell may be covered with an outer decorative shell. The outer shell can be of any suitable material, but is generally plastic or polycarbonate. In some embodiments, the outer shell is hard plastic or polycarbonate affixed to the outer surface of the metal shell. The outer shell may be affixed to the metal shell by friction, adhesive, or other suitable means. In some embodiments, the outer shell is permanently affixed to the metal shell, that is, it is not intended to be removed by the end user. In other embodiments, the outer shell may be designed to be removable, either to interchange one or more outer shell designs, or to allow the user to expose the underlying outer surface of the metal shell (finished or unfinished). Each outer shell may be adorned with a desired design element or color. The outer shell may be of any shape, but typically will take a complementary shape to the underlying metal shell, essentially providing a decorative skin to the metal shell. In some embodiments, the outer shell can be textured to provide another design element.

In modem society, you would be hard pressed to find a purse that did not contain a wireless device such as a cellular phone or a tablet. A fully closed metal purse effectively prevents wireless signals from entering or leaving the purse. Thus, a fully closed metal purse could be an effective solution if one desired to stop wireless communication, say in a theatre or at dinner. However, most people today are reluctant to be cut off from their wireless communications. Accordingly, a modem metal purse should account for this and allow for the passage of wireless signals into and out of the purse such that no loss of wireless communication occurs. Fashion, however, demands that this be accomplished in the most minimally invasive way possible.

Accordingly, some embodiments are provided with an opening to allow for better signal strength within the purse. The opening can be provided in any number of ways, including providing a plurality of perforations in the metal shell, providing one or more slots in the metal shell, or providing a gap (210) between the two metal shells, or a combination of these. The type of metal used also impacts the signal strength, but can be overcome by providing the right opening.

Stainless steel and aluminum purses were prepared with a plurality of perforations 220, a slot 230, and a gap (210), respectively. Although signal strength improved with all three methodologies, the best improvement was found with a gap (210) between the metal shell halves. The tables below illustrate some examples. Keeping in mind that signal strength closer to zero indicates a stronger signal. It can be seen that in steel and aluminum, purses with no gap (210) have a weak signal strength of about −130 dBM compared to −82 and −86 when the phone is sitting in an open half shell. As shown below, just a 0.027 inch gap in the steel purse improves signal strength considerable. The tables also show similar improvements with slots or perforations and a gap. It should be noted that in these tests, an iPhone 4 did not ring below about −110 dBM. Thus, in the closed purse at −130 dBM, the phone signal strength was insufficient for reception, while with the gap achieving −102 or −101 dBm the signal strength was sufficient to receive a call.

|  | Signal Strength dBm |
|---|---|
| Phone on table | −71 |
| Phone in steel shell half | −82 |
| Steel, no gap | −130 |
| Steel with 0.013" gap | −102 |
| Steel with 0.027" gap | −101 |
| Phone in Aluminum shell half | −86 |
| Aluminum, no gap | −130 |
| Aluminum, Perforated (7 × 0.125" diameter) | −114 |
| Aluminum, Slot with no gap (0.125 × 2.125") | −112 |
| Aluminum, Slot with 0.013" gap | −103 |
| Aluminum, Slot with 0.027" gap | −106 |
| Aluminum, Slot with 0.041" gap | −101 |
| Aluminum, Slot with 0.055" gap | −97 |

Accordingly, in some embodiments, a gap is provided sufficient to yield a signal strength of at least −110 dBm in the purse, when closed. In some embodiments, the gap is sufficient to provide a signal strength of at least −106 dBm, at least −105 dBm, at least −103 dBm, at least −102 dBm, at least −101 dBm, at least −100 dBM, at least −97 dBm, at least −95 dBm, at least −93 dBm, at least −90 dBM or any value or range of values therebetween, including endpoints.

In some embodiments, a gap distance of about 0.010 inch to about 0.010" is provided substantially around a peripheral edge. In most instances this will be at the location where the portions of the metal shell meet each other in a closed position. Rather than being completely closed, a gap of the desired distance is provided and maintained when the purse is closed. The gap may be about 0.010 inch, about 0.015 inch, about 0.020 inch, about 0.025 inch, about 0.027 inch, about 0.030 inch, about 0.035 inch, about 0.040 inch, about 0.041 inch, about 0.045 inch, about 0.050 inch, about 0.055 inch, about 0.060 inch, about 0.070 inch, about 0.080 inch, about 0.090 inch, about 0.010 inch or any value or range of values between any of these values, including endpoints. The desired gap may be made and maintained by any suitable means. In particular, one or more spacers (200) can be employed along one or both edges of the metal shells, to maintain the desired gap distance. The spacers (200) may be integrally formed with the metal shell, or may be provided separately by affixing metal, plastic, cloth, rubber, or other material to one or both edges of the metal shells. Alternatively or additionally, a latch mechanism may be employed that locks the metal shells when closed while maintaining the desired gap distance. It should be clear to those of skill in the art that the spacers (200) employed in the purse will be relatively discrete and be limited in size based on the thickness of the metal shell so as to be as unobtrusive as possible. It is contemplated that, although the gap is relatively small and nearly imperceptible, one might want to completely close the purse to purposefully block reception. Thus, in some embodiments, the spacers (200) may be removable or displaceable to a position where they do no create or maintain a gap. The effect can be enhanced through the use of a floating hinge, so that when spacers (200) are present, the hinge floats or expands to accommodate an even gap around the substantially the entire periphery. When the spacers (200) are removed or retracted, the hinge retracts, forming a completely closed seal.

Figure 11:
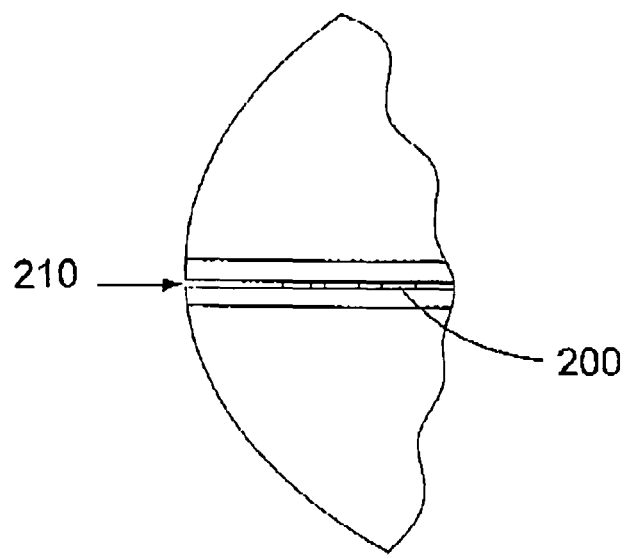
FIG. 11 is a close up view of the embodiment of FIG. 10 showing the gap present in some embodiments.

FIGS. 11 and 12 depict a purse according to one embodiment, and clearly show the gap between the two halves. In this embodiment, the gap is substantially uniform around substantially the entire perimeter. It should be noted, that certain structural elements, such as hinges, strap connectors, and other elements may occupy a portion of the gap without affecting its function in an appreciable way.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

"Optional" or "optionally" means that the subsequently described event or circumstance may or may not occur, and that the description includes instances where the event occurs and instances where it does not.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Although the present invention has been described in considerable detail with reference to certain preferred embodiments thereof, other versions are possible. Therefore, the spirit and scope of the appended claims should not be limited to the description and the preferred versions contained within this specification.

What is claimed is:

1. A purse comprising:
   two metal shells interconnected by a hinge for rotation with respect to one another about the hinge, between an open and a closed position, and defining a storage cavity therebetween;
   each metal shell further comprises a mated peripheral edge;
   one or more spacers (200) on at least one peripheral edge;
   wherein in the closed position, the two metal shells form a gap along substantially the entire peripheral edge of a desired gap distance therebetween, such that the gap distance is sufficient to allow the passage of cellular or wireless signals into and out of the purse, when closed.

2. The purse of claim 1, wherein the desired gap distance is sufficient to yield a signal strength of at least −110 dBm in the purse, when closed.

3. The purse of claim 1, wherein gap distance is sufficient to provide a signal strength of at least −106 dBm to 90 dBM, including endpoints.

4. The purse of claim 1, wherein the gap distance is about 0.010 inch to about 0.090 inch, including endpoints.

5. The purse of claim 1, wherein the purse has a bivalve construction.

6. The purse of claim 1, wherein the purse further defines one of a slot or a plurality of perforations to enhance the effect of the gap on signal strength.

7. The metal purse of claim 1 further comprising at least one outer decorative shell affixed to the metal shell.

8. The metal purse of claim 7, wherein the outer decorative shell comprises plastic or polycarbonate.

9. The metal purse of claim 7, wherein the outer decorative shell is permanently affixed to the metal shell.

10. The metal purse of claim 7, wherein the outer decorative shell is removably affixed to the metal shell.

\* \* \* \* \*